United States Patent [19]

Tezuka et al.

[11] 4,349,264
[45] Sep. 14, 1982

[54] ELECTROMAGNETICALLY DRIVEN SHUTTER

[75] Inventors: Nobuo Tezuka, Tokyo; Michio Hirohata, Inagi, both of Japan

[73] Assignee: Canon Kabushiki Kaisha, Tokyo, Japan

[21] Appl. No.: 231,040

[22] Filed: Feb. 4, 1981

[30] Foreign Application Priority Data

Feb. 8, 1980 [JP] Japan .................................. 55-15414

[51] Int. Cl.³ .............................................. G03B 9/22
[52] U.S. Cl. .................................... 354/234; 354/264
[58] Field of Search ............... 354/234, 235, 133, 271, 354/264; 310/27, 36-38, 261, 265-268, 208; 335/282, 219; 336/225, 227, 232; 352/204; 355/71; 250/229; 350/266, 273-275

[56] References Cited

U.S. PATENT DOCUMENTS 3,512,025  5/1970  Quellet .................................. 310/208

Primary Examiner—L. T. Hix
Assistant Examiner—William B. Perkey
Attorney, Agent, or Firm—Toren, McGeady & Stanger

[57] ABSTRACT

In an electromagnetically driven shutter of the type having a shutter driving rotor arranged to rotate on the optical axis of a photograph-taking lens, the shutter driving rotor is provided with a circular opening and is formed into an approximately rhombic shape consisting of circumferential parts which are concentric with the circular opening and straight parts which extend in the tangential directions of the circumferential parts. A conductor coil is provided along the periphery of the shutter driving rotor. A magnetic field is arranged to act on the straight parts of the coil to rotate the rotor upon supply of electrical energy.

3 Claims, 6 Drawing Figures

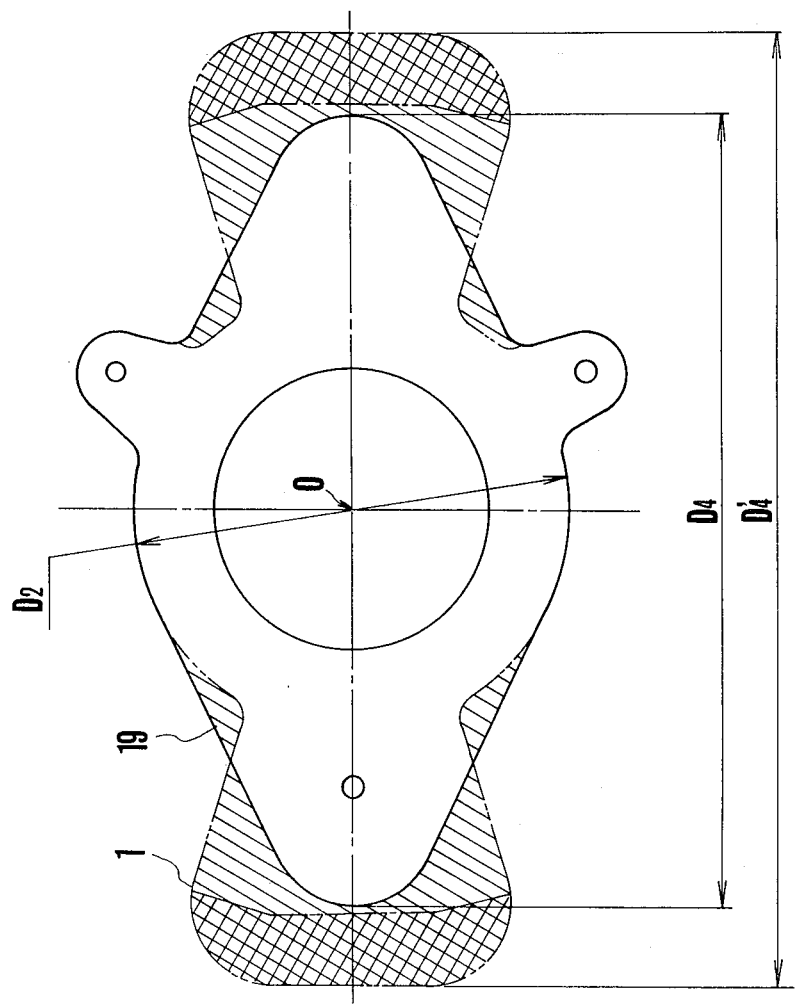

ELECTROMAGNETICALLY DRIVEN SHUTTER

BACKGROUND OF THE INVENTION

1. Field of the Invention

This invention relates to an electromagnetically driven shutter and more particularly to an electromagnetically driven shutter arranged to have a shutter driving rotor rotate on the optical axis of a photograph-taking lens.

2. Description of the Prior Art

There have been known electromagnetically driven shutters arranged to have a shutter driving rotor rotated on the optical axis of a photograph-taking lens with a conductor coil pattern provided on the shutter driving rotor. Such electromagnetically driven shutters include a type having a magnetic flux applied in the direction of the optical axis of a photograph-taking lens. To efficiently produce a driving torque for rotating the rotor, the shutter of this type has been arranged to have an electric current flow in a radial direction from the rotation center of the rotor.

The conventional shutter driving rotor having the conductor coil provided thereon as stated above is arranged as shown in FIGS. 1 and 2 of the accompanying drawings. Referring to these drawings, a rotor 1 is formed to have circumferential parts 1a, radially extending parts 1b and outer peripheral parts 1c. On both sides of the rotor 1, there is provided a conductor coil 2 which is arranged along the periphery of the rotor 1. There are provided shutter driving pins 3a, 3b and 3c which are secured to the rotor 1. In FIG. 2, a reference symbol L indicates the length of the effective portions of magnetic fluxes obtained from permanent magnets, which are not shown. The direction in which an electromagnetic force F is exerted is indicated with an arrow.

As apparent also from these illustrations, the form of the conventional conductor coil 2 causes the electric current to flow in the radial direction from the rotation center of the rotor 1. Therefore, the driving force required for rotating the rotor 1 can be effectively produced. On the other hand, in accordance with this conventional arrangement, the peripheral parts 1a of the rotor 1 in which the electromagnetic force F is not generated becomes larger. This has been causing an increase in the moment of inertia of the rotor 1 and thus resulted in insufficient angular acceleration and poor dynamic characteristics. Besides, the conventional arrangement also has caused the conductor coil 2 to be of a large size, which in turn has caused increase in electric resistance to present a problem also in the electrical aspect.

SUMMARY OF THE INVENTION

The present invention is directed to the solution of the above stated problems presented by the prior art arrangement. It is therefore the general object of the invention to provide an electromagnetically driven shutter in which a conductor coil is arranged to lessen the moment of inertia of a rotor and thus to ensure excellent dynamic characteristics of the shutter.

The object and features of the invention will become apparent from the following detailed description of an embodiment thereof taken in connection with the accompanying drawings.

BRIEF DESCRIPTION OF THE DRAWINGS

FIG. 6 is a plan view comparing the shutter driving rotor of FIG. 1 with the shutter driving rotor of FIG. 4.

DETAILED DESCRIPTION OF PREFERRED EMBODIMENT

Figure 3:
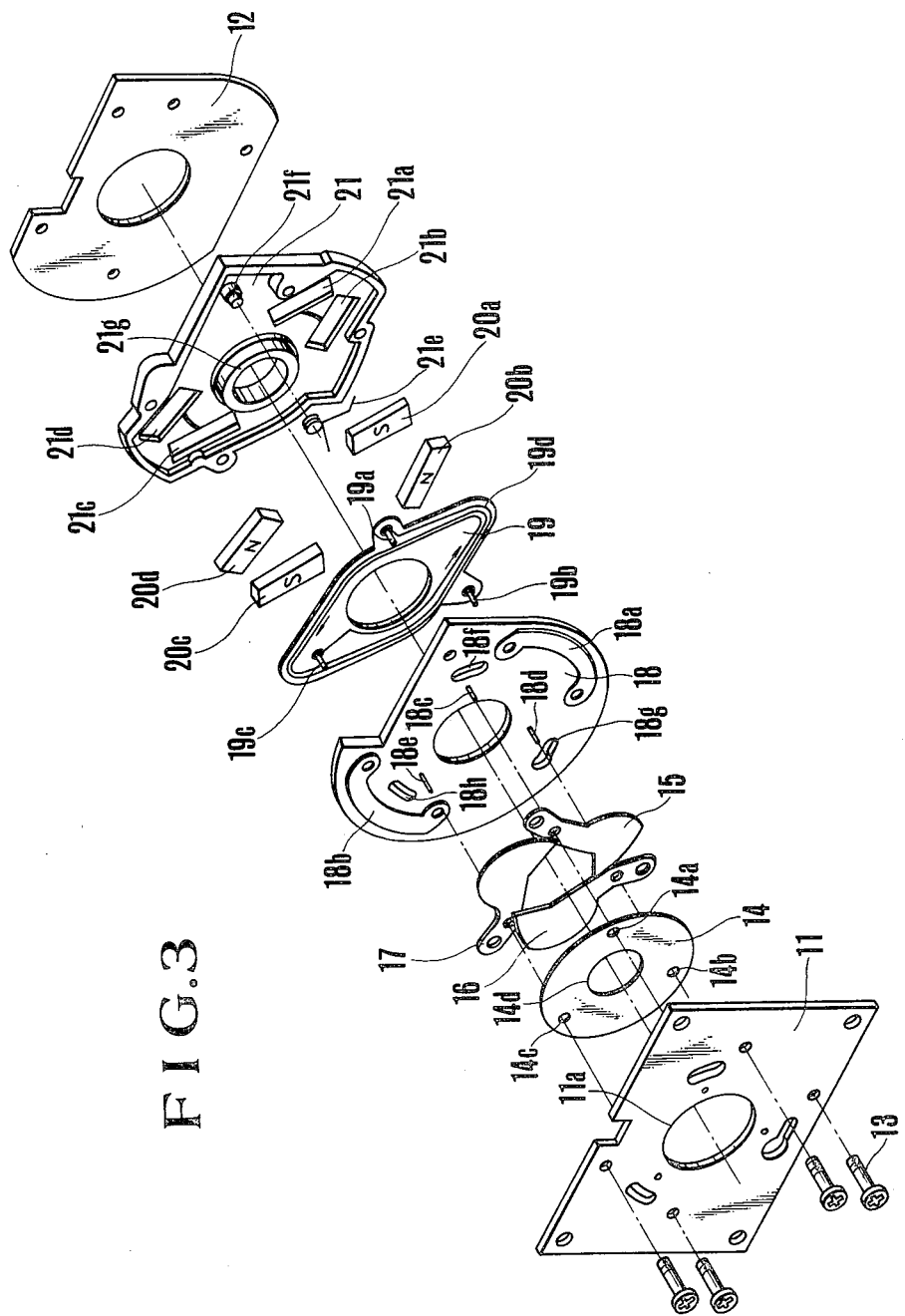
FIG. 3 is an exploded oblique view showing an embodiment of the electromagnetically driven shutter of the present invention.

An electromagnetically driven shutter embodying the present invention by way of example is arranged as described below with reference to the accompanying drawings. FIG. 3 shows, in an exploded manner, the essential components of the electromagnetically driven shutter. Referring to FIG. 3, a first base plate 11 is arranged to be mounted on a camera body. A second base plate 12 is made of a magnetic material. The first and second base plates 11 and 12 are to be mounted with screws 13. Between the first and second base plates 11 and 12, there are provided one after another a shutter opening area defining member 14; three shutter blades 15, 16 and 17 which are made of a synthetic resin material; a guide plate 18 which is made of a magnetic material; a rotor 19; permanent magnets 20a, 20b, 20c and 20d; and positioning member 21. Each of the first base plate 11, the defining member 14, the guide plate 18, the rotor 19, the positioning member 21 and the second base plate 12 is provided with an opening to permit passage of light therethrough. The three shutter blades 15, 16 and 17 are provided for the purpose of blocking the passage of the light and are disposed together with the defining member 14 which defines an area of the opening action of the shutter between the guide plate 18 and the first base plate 11. The guide plate 18 is provided with spacers 18a and 18b which are arranged to determine a movable space for the shutter blades and a space in which the defining plate 14 is to be disposed. Around the opening of the guide plate 18, there are provided pins 18c, 18d and 18e which serve as rotation shafts for the shutter blades 15, 16 and 17. These pins 18c, 18d and 18e are arranged to extend through the shutter blades 15, 16 and 17 and holes 14a, 14b and 14c provided in the defining member 14 and then to be inserted into holes provided in the first base plate 11. The guide plate 18 is further provided with guide holes 18f, 18g and 18h which are arranged to have the shutter driving pins 19a, 19b and 19c of the rotor 19 inserted therein. These shutter driving pins 19a, 19b and 19c thus coming from the rotor 19 serve as driving shafts for shutter blades 15, 16 and 17. The size of the light flux passing opening 14d of the defining member 14 is arranged to be larger than an opening for the aperture of a lens. However, a size which is equal to or larger than the opening for the aperture suffices for the opening 14d. The defining member 14 is made of the same synthetic resin material as the shutter blades 15, 16 and 17 and is prepared in a black color. The synthetic resin material is preferably a heat insulating material such as polyester or the like. The diameter of the holes 14a, 14b and 14c provided in the defining member 14 is determined to give a suitable degree of play relative to that of the pins 18c, 18d and 18e. The positioning member 21 is provided, as shown, with holes 21a, 21b, 21c and 21d for accommodating the permanent magnets 20a, 20b, 20c and 20d. Further, on the positioning member 21, there are also provided a spring peg 21f for mounting a spring 21e thereon which spring is arranged to urge the rotor 19 to turn clockwise and a support 21g which is provided for the rotor 19. In driving the shutter blades 15, 16 and 17, when a current flows to the coil 19d of the rotor 19 through the shutter driving pins 19b and 19c, the magnetic fluxes of the permanent magnets 20a, 20b, 20c and 20d generate an electromagnetic force according to the Fleming's left-hand rule. The electromagnetic force then causes the rotor 19 to rotate counterclockwise against the force of the spring 21e.

Figure 4:
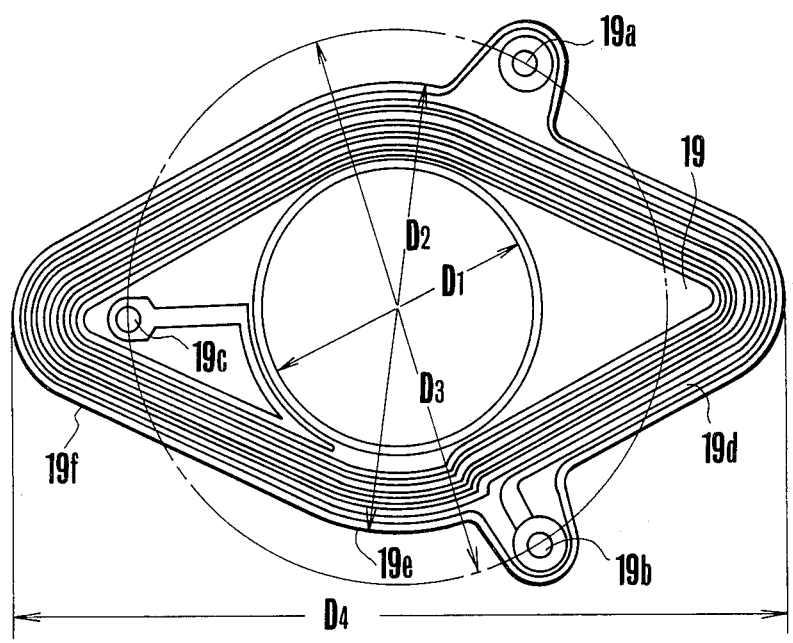
FIG. 4 is a plan view showing a shutter driving rotor shown in FIG. 3.
Figure 5:
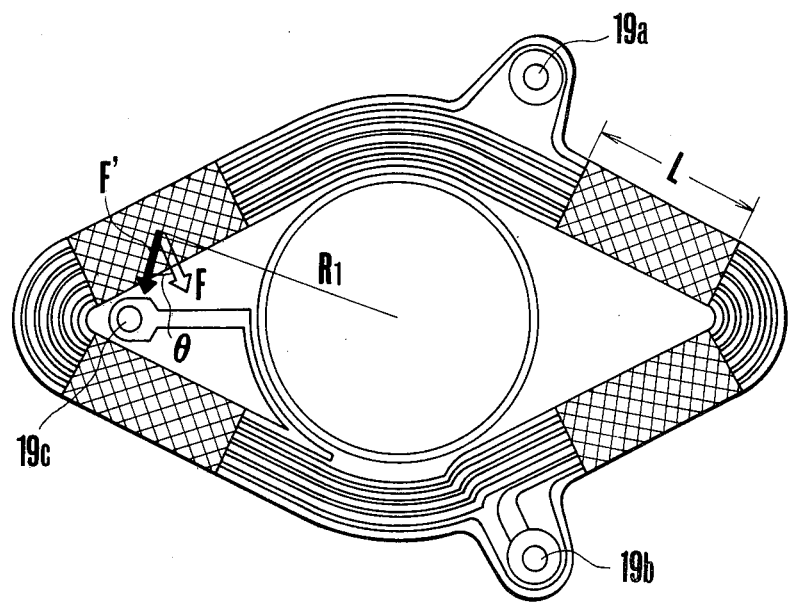
FIG. 5 is a plan view showing the shutter driving rotor of FIG. 4 with effective portions of magnetic fluxes included in the illustration.

Referring now to FIG. 4 which concretely shows the rotor 19, the coil 19d is provided on the rotor 19 and is arranged into a shape as shown. Confronting parts of the coil 19d are arranged to be roughly concentric with the above stated circular opening provided in the rotor. Meanwhile, other parts of the coil 19d extend from the concentric parts in the tangential directions of the concentric or circumferential parts. The coil 19d is thus formed with these parts arranged to be continuous from each other. The rotor 19 is thus formed into an approximately rhombic shape consisting of circumferential parts 19e which are concentric with the circular opening and straight parts extending in the tangential directions. FIG. 5 shows the coil 19d with an effective magnetic flux portion L indicated in each of the tangentially extending parts.

The rotor 19 which is provided with the coil 19d arranged in accordance with the present invention as described in the foregoing is compared with the conventional rotor 1 which is provided with the conventional coil 2 under the same conditions as follows:

Since the diameters D1 of the middle openings of the rotors 19 and 1 are to be determined in accordance with the diameter of a transmission light coming from the photograph-taking lens, the diameter of the rotor 19 is supposed to be equal to that of the rotor 1. Next, the diameter D2 of the circular middle portion of the rotor 19 is also equal to that of the rotor 1, if they have the same effective coil length. Further, the diameters of the shutter driving pins 19a, 19b and 19c of the rotor 19 are also equal to those of the shutter driving pins 3a, 3b and 3c of the rotor 1, because the dimensions of the shutter blades to be driven are the same.

When the length of the effective magnetic flux portions L of the coil 19d of the rotor 19 are assumed to be the same as that of the coil 2 of the rotor 1, the same magnitude of electromagnetic force F is generated by the rotors 19 and 1 with the magnetic flux density and the current arranged to be the same. However, assuming that the average distance from the rotation center of the rotor to the electromagnetic force F generating part is R1 in the rotor 19 and R2 in the case of the rotor 1, there obtains the relation of R2>R1. Therefore, the values of the driving torques to be exerted on these rotors differ from each other. In the case of the rotor 1, since the electromagnetic force F is to be exerted in the tangential direction relative to the rotating direction of the rotor 1, the driving torque T2 can be expressed by: $T2 = F \cdot R2$.

Whereas, in the rotor 19, assuming that the angle defined by the direction in which the electromagnetic force F is exerted and the tangential direction relative to the rotating direction of the rotor 19 is $\theta$, the driving torque T1 can be expressed by: $T1 = F \cdot \cos \theta \cdot R1$ ($0 < \cos \theta < 1$).

Therefore, the driving torques of the two are in the following relation:

$$T1 < T2 (\because R1 < R2).$$

The driving torque T1 generated at the rotor 19 is thus smaller than the driving torque T2 generated at the rotor 1.

Figure 1:
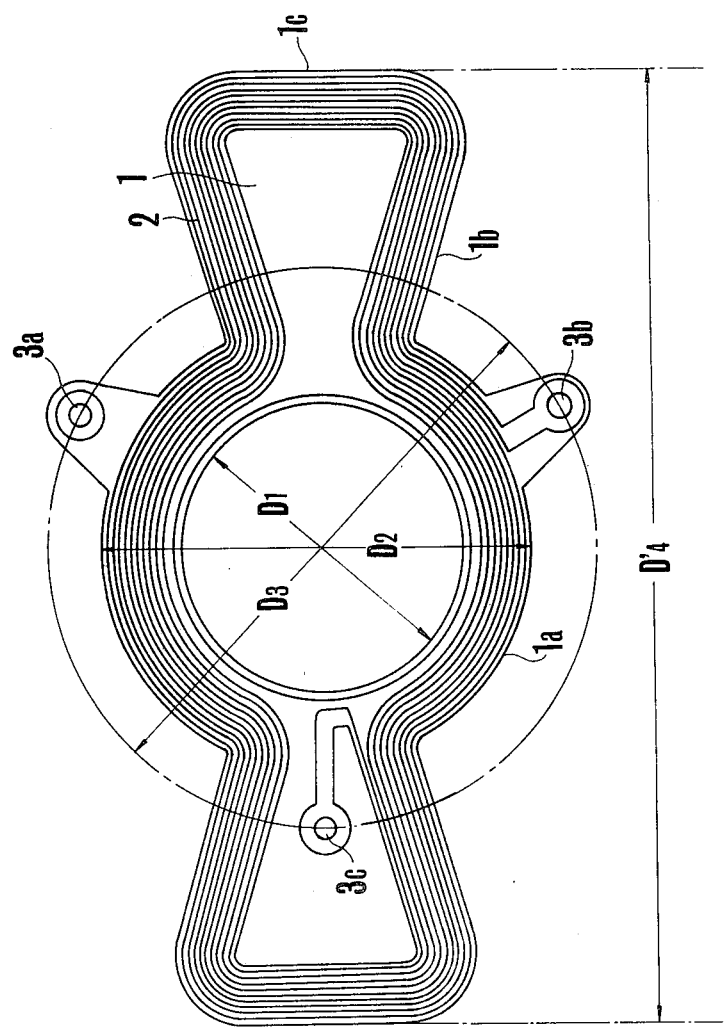
FIG. 1 is a plan view showing the conventional shutter driving rotor.
Figure 2:
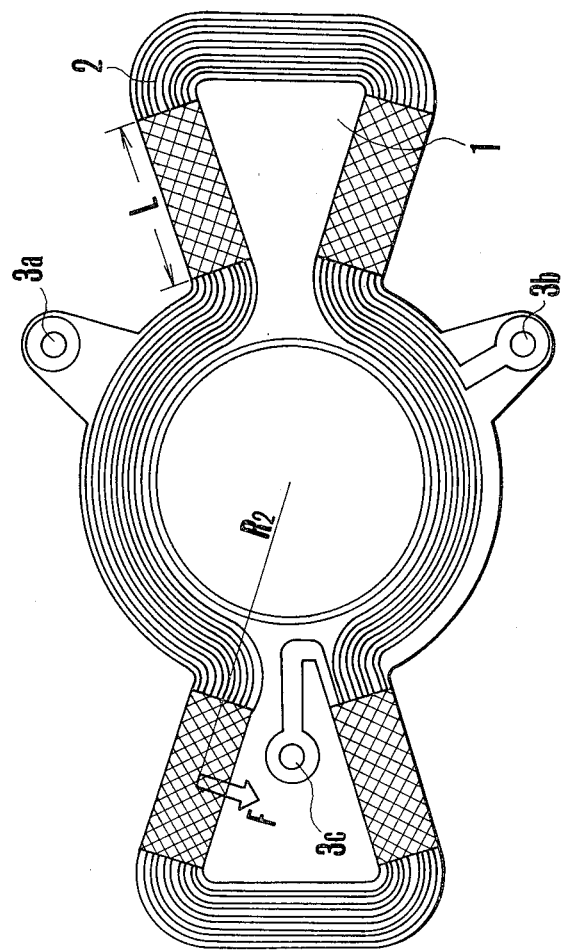
FIG. 2 is a plan view showing the shutter driving rotor of FIG. 1 with effective portions of magnetic fluxes included in the illustration.

In FIG. 6, the rotors 1 and 19 are superposed on each other for comparison under the same conditions and in corresponding dimensional arrangement. As apparent from FIG. 6, the outer dimension D4' of the rotor 1 is larger than the outer dimension D4 of the rotor 19. Assuming that they are of the same thickness and are made of the same material, the hatched parts in FIG. 6 represent the difference between the two in the moment of inertia. Particularly, as also will be understood from FIG. 2, the double hatched parts of the rotor 1 merely serve as conductor parts for forming the coil and do not participate in generating the electromagnetic force. Besides, since they are located at the longest distance from the center of rotation, they increase the moment of inertia of the rotor 1 to a great extent.

Assuming that the shutter shown in FIG. 3 is to be used for a camera using 35 mm film and is arranged to be as small as possible by setting the size at D1 = 14 mm; D3 = 28 mm; and L = 10 mm or thereabout, the moment of inertia I1 of the rotor 19 and the moment of inertia I2 of the rotor 1 are in the following relation:

$$I2 \approx 2.5 \, I1$$

The rotor 1 thus has the moment of inertia about 2.5 times as much as that of the rotor 19. Further, assuming that the angle $\theta$ shown in FIG. 5 is 45 degrees, the relation of the driving torques T1 and T2 of the rotors 19 and 1 becomes:

$$T2 = 1.6 \, T1$$

The driving torque of the rotor 1 is thus about 1.6 times as much as that of the rotor 19. If the rotors 1 and 19 have about the same degree of frictional resistance, the angular acceleration caused by an electromagnetic force at the rotor 19 is about 1.5 times as much as the angular acceleration which takes place at the rotor 1. Therefore, the responsiveness of the rotor 19 exceeds that of the rotor 1 and thus is more advantageous in respect to frictional resistance and resistance to the rotating motion due to deformation caused by heat, etc. The rotor 19 thus gives more stable performance of the shutter. Furthermore, a large portion of the rotor 1 corresponding to the parts indicated by double hatching in FIG. 6 is curtailed in the arrangement of the rotor 19. Since the effective portions of magnetic fluxes are connected at about a minimum distance in the case of the rotor 19, driving can be performed with a low power by virtue of great reduction in electrical resistance.

While the embodiment of the invention which has been described in the foregoing uses a printed coil, the invention is not limited to such coil arrangement but is applicable also to a driving coil prepared by winding an ordinary conductor round a coil yoke. Further, although the invention is applied to a shutter in the embodiment described above, it goes without saying that the invention is also applicable to an electromagnetically driven shutter which is arranged to serve combined purposes as stop blades and shutter.

As described in the foregoing in detail, in accordance with the invention, the moment of inertia of the movable parts of a shutter can be lessened to a great extent for improvement in the dynamic characteristics of the shutter. Since the effective portions of magnetic fluxes are connected at a minimal distance, electrical resistance can be lessened to permit driving with a low power. Also, since the shutter can be formed with a small size, it can be easily placed within a camera.

While a specific embodiment of the invention has been shown and described in detail to illustrate the application of the inventive principles, it will be understood that the invention may be embodied otherwise without departing from such principles.

What is claimed is:

1. An electromagnetically driven shutter, comprising:
    shutter blades;
    a shutter driving rotor for operating said shutter blades, said shutter driving rotor having a circular opening centered at the optical axis of a photograph-taking lens and having circumferential parts concentric with said circular opening and straight parts extending in tangential directions of said circumferential parts, said driving rotor being formed in an approximately rhombic shape in such a manner than angles formed by said straight parts will not be angles of ninety degrees;
    a conductor coil provided along a periphery of said shutter driving rotor; and
    magnets for generating magnetic fluxes which cross orthogonally the conductor coil and are parallel with the optical axis of the photograph-taking lens, said magnetic fluxes operating on the straight parts of said conductor coil.

2. An electromagnetically driven shutter according to claim 1 further comprising:
    pins for transmitting the movement of said shutter driving rotor to said shutter blades, said pins being arranged to have said conductor coil supplied with electrical energy therethrough.

3. An electromagnetically driven shutter according to claim 1, wherein said conductor coil is printed on the surface of said shutter driving rotor.

* * * * *